(12) United States Patent
Roy et al.

(10) Patent No.: US 7,752,392 B1
(45) Date of Patent: Jul. 6, 2010

(54) METHOD AND APPARATUS FOR ACCESSING A VIRTUALIZED STORAGE VOLUME USING A PRE-LOADED VOLUME MAP

(75) Inventors: Subhojit Roy, Pune (IN); Niranjan Sanjiv Pendharkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 84 days.

(21) Appl. No.: 11/342,470

(22) Filed: Jan. 30, 2006

(51) Int. Cl.
*G06F 12/00* (2006.01)

(52) U.S. Cl. .............. 711/118; 711/170; 711/203; 709/223; 370/402

(58) Field of Classification Search .......... 711/118
See application file for complete search history.

(56) References Cited

U.S. PATENT DOCUMENTS

| | | | |
|---|---|---|---|
| 7,437,506 B1 * | 10/2008 | Kumar et al. | 711/114 |
| 2004/0028063 A1 * | 2/2004 | Roy et al. | 370/402 |
| 2006/0018505 A1 * | 1/2006 | Cherian et al. | 382/100 |
| 2006/0206603 A1 * | 9/2006 | Rajan et al. | 709/223 |

* cited by examiner

*Primary Examiner*—Brian R Peugh
*Assistant Examiner*—Matthew Bradley
(74) *Attorney, Agent, or Firm*—Moser IP Law Group

(57) ABSTRACT

A method and apparatus for accessing a virtualized storage volume are described. At least one volume map is copied to a virtualization switch prior to an application requesting access to a storage volume via the virtualization switch, where the volume map facilitates mapping the storage volume access request to an appropriate physical storage device and is copied from a source external to the virtualization switch.

18 Claims, 2 Drawing Sheets

METHOD AND APPARATUS FOR ACCESSING A VIRTUALIZED STORAGE VOLUME USING A PRE-LOADED VOLUME MAP

BACKGROUND OF THE INVENTION

1. Field of the Invention

Embodiments of the present invention generally relate to accessing data in a virtualized storage volume and, more particularly, to a method and apparatus for pre-loading a volume map used to translate a logical unit number (LUN) of a virtualized storage volume to a physical storage device LUN.

2. Description of the Related Art

Many business organizations and governmental entities rely upon applications that access large amounts of data for mission-critical applications. Often such data is stored on many different storage devices, which may be heterogeneous in nature, including many different types of devices from many different manufacturers. Collectively these storage devices form a storage area network (SAN).

A SAN provides multiple benefits, allowing for remote data backup and disaster recovery over a computer network, centralized administration of the data, and high availability of the data to the computer network. Sharing storage simplifies storage administration and adds flexibility since cables and storage devices do not have to be physically moved to move storage from one host to another. Adding additional storage capacity to the SAN benefits each host on the computer network.

Configuring individual applications that consume data, or application servers that host such applications, to recognize and directly interact with each storage device that may possibly be encountered in a heterogeneous storage environment is increasingly difficult as the environment is scaled in size and complexity. Therefore, in some storage environments, specialized storage management software and hardware may be used to provide a more uniform storage model to storage consumers. Such software and hardware may also be configured to present physical storage devices as virtual storage devices, e.g., using a Logical Unit Number (LUN), to computer hosts, and to add storage features not present in individual storage devices to the storage model. When virtualized, a collection of physical storage devices can be accessed using a single LUN. The added storage features may be referred to as storage virtualization features, and the software and/or hardware providing the virtual storage devices and the added storage features may be termed "virtualizers" or "virtualization controllers". Virtualization may be performed within computer hosts, such as within a volume manager layer of a storage software stack at the host, and/or in devices external to the host, such as virtualization switches or virtualization appliances. Such external devices providing virtualization may be termed "off-host" virtualizers, and may be utilized in order to offload processing required for virtualization from the host. Off-host virtualizers may be connected to the external physical storage devices for which they provide virtualization functions via a variety of interconnects, such as Fiber Channel links, Internet Protocol (IP) networks, iSCSI networks, and the like.

Software applications that need to access storage on the SAN may only be aware of a Logical Unit Number (LUN) for the virtualized storage. A virtualization switch translates a virtual LUN into physical storage LUNs of the physical storage devices that comprise the virtual storage allowing a software application to access data on the storage devices within the SAN. The virtualization switch may be an integrated circuit with a memory for storing physical addresses associated with virtual addresses. The amount of memory required by the virtualization switch to store the mapping between each virtual LUN and the associated physical LUN(s) increases as the number of LUN's and virtual addresses on the SAN increases. Adding additional memory to a virtualization switch to store all mappings is cost-prohibitive. Therefore, it is not possible to store all the logical to physical mappings at the DPPs (Data Path Processors) of the virtualization switch at all times.

In the event that the logical to physical mapping is not available at the virtualization switch when an access is made by a host to a logical region of the virtual LUN, a "fault" occurs in the Control Path Processor (CPP) of the virtualization switch. Upon a fault, the virtualization switch must retrieve the LUN translations from a processor or an external volume server. Retrieving the physical LUN translations from an external source is time-consuming and inefficient because doing so involves one or more interrupts and/or network accesses.

Thus, there is a need in the art for a method and apparatus which predicts logical addresses that will be accessed by an application executing on the host and stores the corresponding translations in the memory of the virtualization switch proactively, before the virtualized storage is accessed.

SUMMARY OF THE INVENTION

The present invention is a method and apparatus for pre-loading a volume map for a virtualized storage volume before an application starts accessing the virtualized storage volume. More particularly, the method includes copying at least one volume map corresponding to a virtualized LUN onto a virtualization switch. Upon a specific application requesting access to the storage volume via the virtualization switch, the map facilitates mapping a storage volume access request to an appropriate physical storage volume. The apparatus includes pre-loading software for copying the at least one volume map to the virtualization switch to facilitate address translations. The invention prevents faulting at the virtualization switch, increasing the efficiency with which the application accesses data on the storage volume via the virtualization switch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method and apparatus for pre-loading the logical to physical LUN translations for a virtualized storage volume. The method includes copying, in advance of an access request, at least one volume map to a virtualization switch. The map facilitates mapping a storage volume access request to an appropriate physical storage upon a specific application requesting access to the storage volume via the virtualization switch. The apparatus includes pre-loading software for copying the at least one volume map to the virtualization switch to facilitate mapping the storage volume access request to the appropriate storage volume.

Figure 1:
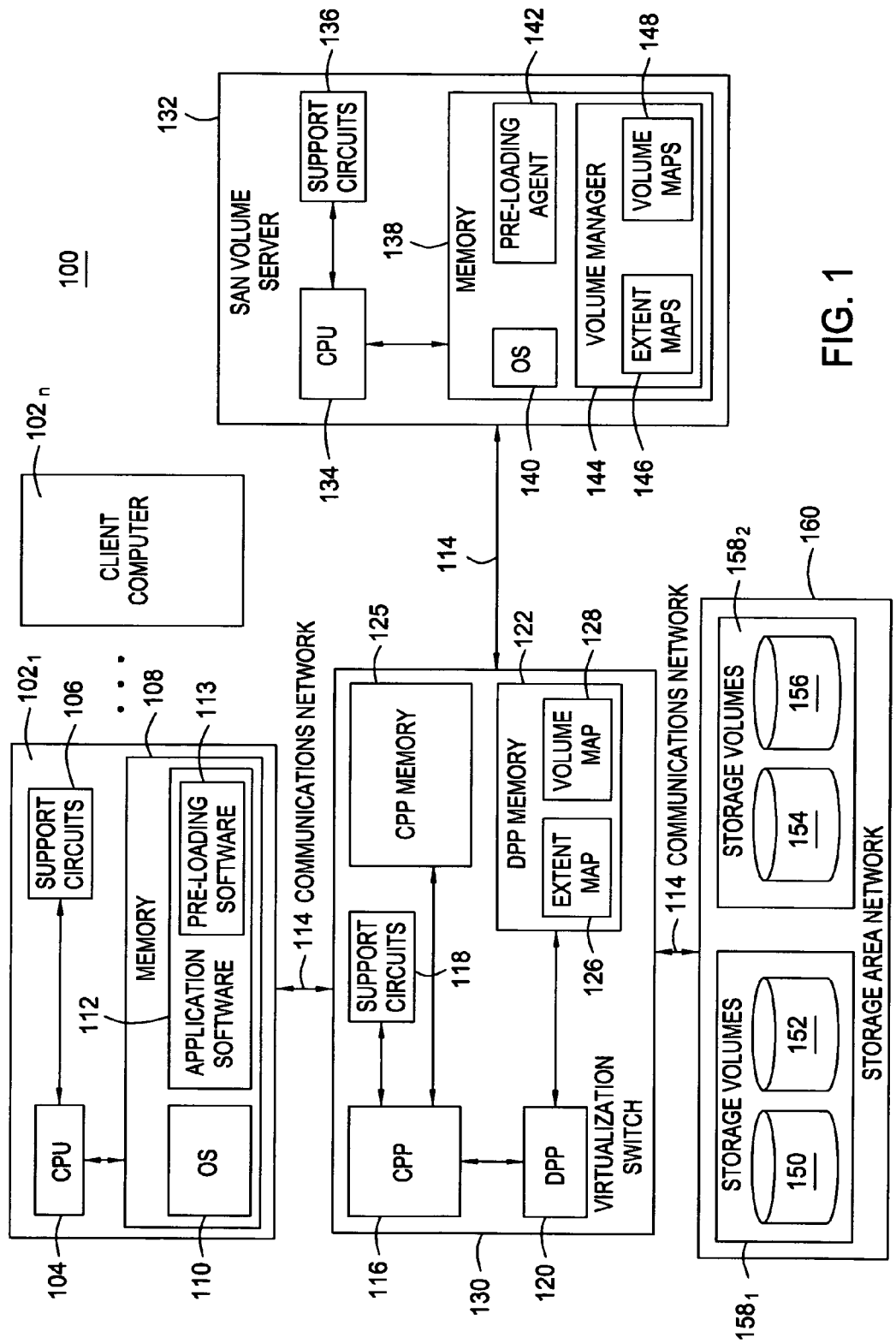
FIG. 1 is a distributed computing environment in which the present invention may be utilized.

FIG. 1 is a distributed computing environment 100 in which the present invention may be utilized. The distributed computing environment 100 comprises client computers $102_1$ to $102_n$ (collectively 102), a virtualization switch 130, a SAN volume server 132, and storage volumes $158_1$ and $158_2$ (collectively 158). The client computers 102, virtualization switch 130, volume server 132, and a storage area network (SAN) 160. A communications network 114 connects the various components of the environment 100 to one another. The communications network 114 may be any conventional network, such as an Ethernet network, iSCSI or a fiber channel network.

The client computer 102 comprises at least one central processing unit (CPU) 104, support circuits 106, and memory 108. The CPU 104 may comprise one or more conventionally available microprocessors. The support circuits 106 are well known circuits that comprise power supplies, clocks, input/output interface circuitry and the like.

Memory 108 may comprise random access memory, read only memory, removable disk memory, flash memory, and various combinations of these types of memory. The memory 108 is sometimes referred to as main memory and may in part be used as cache memory or buffer memory. The memory 108 stores various software packages, such as an operating system (OS) 110 and application software 112. The application software 112 may include productivity software, collaboration software, Internet software, word processing software, electronic mail software, and the like.

The application software 112 includes pre-loading software 113. The pre-loading software 113 is software that predicts which volume map 148 and extent map 146 will be required by the virtualization switch 130 to translate a virtual LUN into a physical LUN when the application software 112 needs to access data on one or more storage volumes $158_1$ and $158_2$ within the SAN 160. The SAN 160 is shown as comprising two virtual storage volumes $158_1$ and $158_2$. The storage volumes $158_1$ and $158_2$ are identified as virtual LUNs by hosts. The virtual storage volumes $158_1$ and $158_2$ comprise individual, physical storage devices 150, 152, 154, and 156. To facilitate access to the physical devices, the virtual LUN of the virtual volume is translated to the physical device LUN to identify the device in which the requested data is stored. Application software 112, such as anti-virus software and back up software, request access to data within one or more virtual storage volumes in a well known and predictable manner. For example, backup software knows exactly which files will be backed up and order in which they will be accessed. This allows the pre-loading software 113 to be aware of the pattern in which the application software 112 will access the virtual storage volumes of the SAN 160. The pre-loading software 113 provides the access pattern to a pre-loading agent 142 in the SAN volume server 132 as discussed below.

The client computer 102 may include one or more individual personal computers (PCs), wireless devices, personal digital assistants, desktop computers, laptop computers, servers or any other digital device that may benefit from connection to the communications network 114.

The virtualization switch 130 comprises a control path processor (CPP) 116, support circuits 118, a CPP memory 125, at least one data path processor (DPP) 120, and a DPP memory 122. The DPP and its memory generally reside within switch ports of the virtualization switch. A switch 130 generally comprises a plurality of ports (only two are shown—one coupled to the client computer 102 and one coupled to the SAN 160. The CPP 116 functions as a central processing unit (CPU) for the virtualization switch 130. The support circuits 118 are well known circuits that support the operation of the CPP and DPP. The support circuits 118 may comprise power supplies, clocks, input/output interface circuitry and the like.

The CPP memory 125 may comprise random access memory, read only memory, removable disk memory, flash memory, and various combinations of these types of memory. The CPP memory 125 is sometimes referred to as main memory and may in part be used as cache memory or buffer memory.

The DPP 120 receives fibre channel packets, reads the packets to identify a virtual address, and utilizes the volume map 128 to resolve a physical address associated with the virtual address. The DPP 120 is coupled to a DPP memory 122. The DPP memory 122 may comprise random access memory, read only memory, removable disk memory, flash memory, and various combinations of these types of memory. The DPP memory 122 stores various files, such as extent maps 126 and volume maps 128. The size of DPP memory 122 is limited. As such, this memory cannot accommodate the volume/extent maps of all virtualized LUNs to be stored in the DPP memory at all times.

The SAN volume server 132 comprises at least one central processing unit 134, support circuits 136, and a memory 138. The CPU 134 may comprise one or more conventionally available microprocessors. The support circuits 136 are well known circuits that comprise power supplies, clocks, input/output interface circuitry and the like. The SAN volume server 132 creates and manages storage volumes 158 and creates the volume map 148 and extent map 146 for storage volume 158 as discussed below.

Memory 138 may comprise random access memory, read only memory, removable disk memory, flash memory, and various combinations of these types of memory. The memory 138 is sometimes referred to as main memory and may in part be used as cache memory or buffer memory. The memory 138 stores various software packages, such as an operating system (OS) 140, volume manager 144 and a pre-loading agent 142. The volume manager 144 comprises volume map(s) 148 and extent map(s) 146.

The volume server 132 contains storage virtualization software as part of the volume manager 144 that is similar to a VERITAS SANVM VS. The volume server 132 creates volumes (such as volumes $158_1$ and $158_2$) using various configurations like mirror, RAID, and the like. The configuration information about the volumes is then downloaded by the volume server 132 into the virtualization switch 130 (and, eventually, into the switch ports). When a volume is exported as a virtualized LUN, this LUN information, i.e., the associated logical to physical LUN mapping is sent by the volume server 132 to the virtualization switch 130. Furthermore, the logical access pattern of the application can be sent through the network 114 to the virtualization switch 130 that loads the virtualization switch ports with the corresponding volume/extent maps. In one embodiment of the invention that uses VERITAS SANVM VS as the volume server, the access pattern information for an application is provided to a virtualization layer of the volume server.

The volume map 148 comprises the translation of the virtual LUN to the various physical LUNs that identify the physical storage devices that comprise the virtual storage volume. The extent map 146 contains information on whether to fault if an I/O request is received for a particular region of the virtual storage volume such that the CPP or the volume server could undertake more complex operations such as copy-on-write and the like. For some virtual LUN addresses, application data at those addresses must be handled in a specific manner. As such, if an I/O request is received that involves data stored in locations identified as "fault" in the extent map, a fault is generated such that the CPP or volume server can specially handle the I/O request. Since the extent map and the volume map operate together to define the handling of an I/O request, both the volume and extent maps are pre-loaded into the DPP memory.

The pre-loading agent 142 instructs the SAN volume server 132 to download an appropriate volume map 148 and extent map 146 into the DPP memory 122 of the virtualization switch 130. The volume map 148 and extent map 146 are stored in the DPP memory 122 as volume map 128 and extent map 126 respectively. The application software 112 accesses the storage volumes 158 via the virtualization switch 130. The virtualization switch 130 maps I/O requests from the application software 112 to the storage volumes using the volume map 128 and extent map 126. Since the appropriate volume map 128 and extent map 126 are present in the DPP memory 122 prior to the application software 112 making an I/O request, the probability of a fault is decreased.

The volume map 128 comprises information that allows a virtual LUN to be mapped to the appropriate physical LUN. The extent map 126 comprises information that enables the DPP 120 to determine whether a "fault" needs to be generated when a location on the virtualized LUN is accessed. All the translations from logical to physical LUNs may not be contained within the volume map within the DPP memory at all times. There may be "holes" in the address space. When an access is made to a location within the virtualized LUN whose mapping is not available within volume map 128, a "fault" occurs in order to fetch this information from the volume server 132.

As mentioned above, the extent map 126 comprises of data handling attributes associated with certain ranges of the virtualized LUN. For example: READ/WRITE allow, READ fault, WRITE fault, and the like. These attributes enable the DPP 120 to generate faults to the CPP 116 when those regions with special attributes are accessed. Setting such attributes on the extent maps enables the volume server 132 to execute more complex activities such as snapshot creation, copy-on-write, and the like. Complex activities are those that are more complex than just the translation of logical to physical addresses that is generally performed by the DPP 120.

Storage volume $158_1$ comprises, for example, physical storage devices 150 and 152 that are addressed using physical LUNs. Storage volume $158_2$ comprises physical storage devices 154 and 156 that are also addressed using physical LUNs. In this simple example, I/O requests addressed to the virtual volume $158_1$ would be translated to LUNs for storage devices 150 and 152, similarly I/O requests for virtual volume $158_2$ would be translated to LUNs for storage devices 154 and 156.

The pre-loading agent 142 instructs the SAN volume server 132 to download the appropriate extent map 146 and volume map 148 into the DPP memory 122 of the virtualization switch 130. The extent map 146 and volume map 148 facilitates mapping of access requests from the application software 112 to a specific LUN, i.e., 150, 152, 154 and 156.

Figure 2:
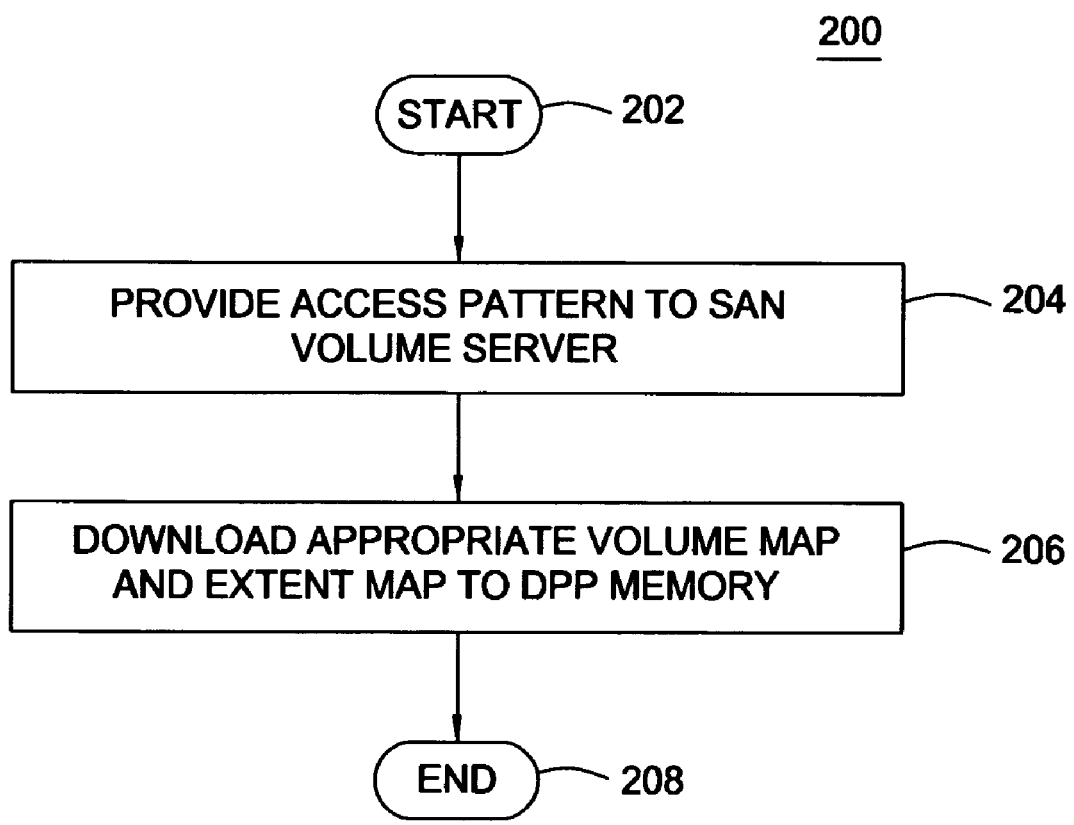
FIG. 2 is a flow diagram of a method that utilizes the present invention.

FIG. 2 is a flow diagram of a method 200 that utilizes the present invention. The method 200 begins at step 202 and proceeds to step 204. At step 204, pre-loading software 113 within application software 112 provides an access pattern to a SAN volume server 132. The access pattern is a complete description of the pattern in which the application software 112 will access information on virtual storage volumes $158_1$ and $158_2$. At step 206, the SAN volume server 132 downloads an appropriate volume map 148 and extent map 148 into the DPP memory 122. The method 200 ends at step 208.

Once loaded, the volume map 148 is used in a conventional manner, i.e., by the DPP 120 to map the I/O request from the application software 112 to an appropriate physical storage device 150, 152, 154, or 156. The extent map 146 determines whether to take an action on access to a particular range of addresses within the virtual storage volume 158.

By having the volume map 148 and the extent map 146 preloaded into the DPP memory 122, the pre-loading software 142 facilitates mapping of the I/O request to the appropriate physical storage device. This reduces faulting of the I/O request from the DPP 120 to the CPP 116. The volume map 148 provides a map to the physical storage device to fulfill the I/O request. The extent map 146 contains information on whether to fault if an I/O request is received on a particular region of the virtual storage volume such that the CPP or the volume server could undertake more complex operations such as copy-on-write and the like.

The pre-loading software 113 functions well for application software 112 that predictably accesses at least one storage volume 158. The pre-loading software 142 may exist within the application software 112, the virtualization switch 130, the SAN volume server 132, or within the memory of any computer system that accesses at least one storage volume 158. Examples of application software 112 that benefit from the pre-loading software 142 include antivirus and backup software. By preventing faulting of the DPP 120, the pre-loading software 142 increases the performance of the application software 112 and other applications that request access to the storage volumes 158. Furthermore, the volume map for volumes that are large or utilize complex configurations like data striping can consume a large amount of memory. Similarly, the extent map associated with a virtualized storage volume that is associated with a copy-on-write snapshot technique could be very large due to fragmentation of the extent maps having different sets of attributes for different regions of the virtualized storage volume. Also, in situations where there are many virtualized storage volumes handled by a virtualization switch such that the entire volume and extent maps for a given virtualized storage volume cannot be accommodated in the DPP memory at all times. These are situations where the chances of "faulting" are greatly increased and pre-loading the extent and volume maps in accordance with the invention reduces faults and therefore increases performance.

Furthermore, even if the entire extent or volume map is not loaded at one time, an initial portion of the map can be loaded and, as the application continues with its accesses to the virtual volume, the translations for the already accessed regions can be replaced with translations that are expected to occur in the future. Such a "rolling" use of the maps is useful when the maps are very large and may not be able to be stored in their entirety within the DPP memory.

While the foregoing is directed to embodiments of the present invention, other and further embodiments of the invention may be devised without departing from the basic scope thereof, and the scope thereof is determined by the claims that follow.

The invention claimed is:

1. A method for accessing a virtualized storage volume comprising:
   providing an access pattern for accessing information on at least one virtual storage volume;
   prior to a storage volume access request by an application requesting access to a storage volume via a virtualization switch, copying an initial portion of a volume map to the virtualization switch to facilitate mapping the storage volume access request to an appropriate physical storage device of the at least one virtual storage volume, wherein the initial portion of the volume map is copied from an entity external to the virtualization switch based upon the access pattern; and
   after one or more additional storage volume access requests by the application requesting access to the storage volume via the virtualization switch, replacing the initial portion of the volume map with an additional portion of the volume map at the virtualization switch, wherein the additional portion of the volume map is copied from the entity external to the virtualization switch based upon the access pattern.

2. The method of claim 1 wherein the virtualization switch comprises a memory for temporarily storing the at least one volume map.

3. The method of claim 2 wherein the memory is coupled to a data path processor.

4. The method of claim 3 wherein the data port processor is coupled to a control path processor.

5. The method of claim 4 wherein the initial portion of the volume map is requested by the control path processor.

6. The method of claim 1 wherein the entity is a SAN volume server.

7. The method of claim 1 wherein the specific application is either an antivirus application or a backup application.

8. The method of claim 1 wherein the volume map is used to map the storage volume access request to an appropriate storage volume of the at least one virtual storage volume.

9. The method of claim 1 further comprising copying at least one extent map to the virtualization switch to facilitate using complex storage attributes for different regions within the virtualized LUN.

10. An apparatus for accessing a virtualized storage volume comprising:
    means for providing an access pattern for accessing information on at least one virtual storage volume;
    means for copying, prior to a storage volume access request by an application requesting access to a storage volume via a virtualization switch, an initial portion of a volume map to the virtualization switch to facilitate mapping the storage volume access request to an appropriate physical storage device of the at least one virtual storage volume, wherein the initial portion of the volume map is copied from an entity external to the virtualization switch based upon the access pattern; and
    means for replacing, after one or more additional storage volume access requests by the application requesting access to the storage volume via the virtualization switch, the initial portion of the volume map with an additional portion of the volume map at the virtualization switch, wherein the additional portion of the volume map is copied from the entity external to the virtualization switch based upon the access pattern.

11. The apparatus of claim 10 wherein the virtualization switch further comprises a memory for temporarily storing the at least one volume map.

12. The apparatus of claim 11 wherein the memory is coupled to a data path processor.

13. The apparatus of claim 12 wherein the data path processor is coupled to a control path processor.

14. The apparatus of claim 13 wherein the initial portion of the volume map is requested by the control path processor.

15. The apparatus of claim 10 wherein the entity is a SAN volume server.

16. The apparatus of claim 10 wherein the specific application is either an antivirus application or a backup application whose access pattern is well known even before the application starts.

17. A system for accessing a virtualized storage volume comprising:
    a virtualization switch for mapping an access request to at least one virtual storage volume;
    a SAN volume server for managing the at least one virtual storage volume and storing at least one volume map and at least one extent map; and
    a processor configured to execute pre-loading software for providing an access pattern for accessing information on the at least one virtual storage volume and copying an initial portion of the at least one volume map and the at least one extent map to the virtualization switch from the SAN volume server in response to an access request to the at least one virtual storage volume from an application, wherein the copying the initial portion of the at least one volume map and the at least one extent map is based on the access pattern; and further configured to after one or more additional storage volume access requests by the application requesting access to the storage volume via the virtualization switch, replacing the initial portion of the at least one volume map with an additional portion of the at least one volume map at the virtualization switch, wherein the additional portion of the at least one volume map is copied from the entity external to the virtualization switch based upon the access pattern.

18. The system of claim 17 further comprising a client computer for executing the application, wherein the application requests access to the at least one virtual storage volume via the virtualization switch.

* * * * *